US007034669B2

(12) United States Patent
Lamb

(10) Patent No.: US 7,034,669 B2
(45) Date of Patent: Apr. 25, 2006

(54) ANTI-COLLISION PROTECTION SYSTEM

(75) Inventor: Peter John Lamb, Mackay (AU)

(73) Assignee: BHP Billiton Innovation Pty Ltd., Melbourne (AU)

( * ) Notice: Subject to any disclaimer, the term of this patent is extended or adjusted under 35 U.S.C. 154(b) by 0 days.

(21) Appl. No.: 10/466,708

(22) PCT Filed: Jan. 17, 2002

(86) PCT No.: PCT/AU02/00048

§ 371 (c)(1),
(2), (4) Date: Oct. 29, 2003

(87) PCT Pub. No.: WO02/058034

PCT Pub. Date: Jul. 25, 2002

(65) Prior Publication Data

US 2004/0055986 A1 Mar. 25, 2004

(30) Foreign Application Priority Data

Jan. 17, 2001 (AU) .................................... PR2570

(51) Int. Cl.
*B60Q 1/00* (2006.01)

(52) U.S. Cl. ...................... 340/436; 340/679; 340/680; 340/685; 340/686.6; 212/276; 212/280

(58) Field of Classification Search ................ 340/679, 340/680, 685, 686.6; 212/276, 280
See application file for complete search history.

(56) References Cited

U.S. PATENT DOCUMENTS

| | | | | |
|---|---|---|---|---|
| 5,198,800 A * | 3/1993 | Tozawa et al. | .......... | 340/573.1 |
| 5,343,739 A * | 9/1994 | Curry | ......................... | 212/280 |
| 5,481,248 A * | 1/1996 | Kruh | .......................... | 340/685 |
| 5,634,565 A * | 6/1997 | Lesage | ....................... | 212/276 |
| 6,473,715 B1 * | 10/2002 | Eckstine | ..................... | 702/151 |
| 6,614,721 B1 * | 9/2003 | Bokhour | ..................... | 367/128 |

* cited by examiner

*Primary Examiner*—Daniel Wu
*Assistant Examiner*—Samuel J. Walk
(74) *Attorney, Agent, or Firm*—Miles & Stockbridge P.C.; Edward J. Kondracki

(57) ABSTRACT

An anti-collision protection system for machines that operate in a raw material stockpile yard is disclosed. The machines are moveable in the yard in defined paths, with each machine including a material delivery and/or material recovery boom that can be rotated about a vertical axis. The system includes a means for defining an envelope around each boom (5) that moves with the boom, with each envelope forming a boundary of an exclusion zone for the boom. The system also includes a means for detecting an intersection of the boundaries of the exclusion zones and a means responsive to a detected boundary intersection to prevent collision of the machines.

24 Claims, 3 Drawing Sheets

ANTI-COLLISION PROTECTION SYSTEM

BACKGROUND OF THE INVENTION

1. Field of the Invention

The present invention relates to an anti-collision protection system for machines that operate in a raw material stockpile yard, such as (by way of example) a coal stockpile.

An object of the present invention is to provide an anti-collision protection system that prevents machines/machine collisions with minimal disruptions to normal operations of the yard and allows maximum useable space for yard operations.

2. Description of Related Art

In the context of a raw material stockpile yard, the machine/machine collisions are collisions between machines, including stackers and stackers/reclaimers, that typically operate in such yards to deliver materials to and to recover materials from the yards.

Typically, these machines travel in defined paths on a network of rail tracks that are laid in the yard. Typically, the network comprises a series of parallel tracks. Typically, the machines include (i) a body and (ii) a boom that has a material delivery and/or recovery end and extends from the body. Typically, the boom includes a counterweight at the end of the boom that is opposite to the material delivery and/or recovery end. Typically, the boom is mounted to the body so that the boom can be rotated 360° about a vertical axis and can be raised/lowered to change the height of the material delivery and/or recovery end of the boom.

The location of a boom in space is described hereinafter in relation to the slew angle and the luff angle of the boom and the position of the machine on the defined path, such as the rail track.

The term "slew angle" of a boom of a machine is understood herein to mean the angle of the boom in relation to a nominated axis in the x-y plane. One suitable axis is the rail track axis in the direction of forward movement of the machine.

The term "luff angle" of a boom of a machine is understood to mean the angle of the boom with the horizontal.

SUMMARY OF THE INVENTION

According to the present invention there is provided an anti-collision protection system for machines that operate in a raw material stockpile yard, the machines being moveable in the yard in defined paths, each machine including a material delivery and/or material recovery boom that can be rotated about a vertical axis, which anti-collision protection system includes:

(a) a means for defining an envelope around each boom that moves with the boom, each envelope forming a boundary of an exclusion zone for the boom;

(b) a means for detecting an intersection of the boundaries of the exclusion zones; and (c) a means responsive to a detected boundary intersection to prevent collision of the machines.

Preferably the envelope of each boom is defined in relation to a longitudinal axis of the boom. The longitudinal axis of the boom forms a reference line for producing the envelope.

Preferably the envelope is rectangular in shape.

Preferably the envelope is rectangular in shape when the envelope and the longitudinal axis of the boom are projected onto the x-y plane.

In other words, preferably the envelope is rectangular in shape when the envelope is drawn on the x-y plane in relation to the longitudinal axis of the boom as the axis appears in top plan view projected onto the x-y plane.

Preferably the long sides of the envelope are equi-spaced from the longitudinal axis of the boom.

Preferably the short sides of the envelope are equi-spaced from opposite ends of the boom.

Preferably the envelope of each boom is responsive to the speed of slew and/or the speed of long travel of the machine and expands as the machine speed increases and contracts as the speed decreases.

Preferably the envelope is defined by vector calculations that create the envelope as an envelope that moves with the boom.

Preferably the means for detecting an intersection of the boundaries of the exclusion zones for the booms includes a means for defining the locations of the envelopes in space and a means for determining whether the envelopes intersect.

Preferably the means for locating the envelopes in space includes, on each machine, a sensor for measuring the slew angle of the boom and a sensor for measuring the long travel of the machine along the defined path of the machine.

Typically, the slew angle sensor of each machine is mounted on a slew ring of the machine.

Typically, the defined path of each machine is a rail track in the yard.

Preferably the long travel sensor is a wheel-mounted sensor on the machine.

Preferably the anti-collision system includes a plurality of envelopes around each boom, the envelopes including an innermost envelope and successively outwardly spaced envelopes.

Preferably the means responsive to a detected boundary intersection responds differently for each of the plurality of envelopes.

Preferably there are three envelopes around each boom and the means responsive to a detected boundary intersection:

(a) initiates a message on an operator console in a control room when there is penetration (i.e. an intersection) of the outermost envelope;

(b) movement of the penetrating machine is stopped when there is penetration of the middle envelope; and (c) movement of both machines is disabled when there is penetration of the innermost envelope.

Preferably the means responsive to a detected boundary intersection initiates appropriate messages on the operator console when events (b) and (c) occur.

Preferably the means responsive to a detected boundary intersection includes a means for moving the machines involved in the intersection away from each other. In this context, the reference to "moving the machines" includes moving one or both booms of the machines.

Preferably the means for moving the machines involved in the boundary intersection away from each other includes a means for determining the minimum distance between the booms of the machines.

Preferably each boom includes a counterweight, whereby the boom includes a boom section and a counterweight section.

Preferably the anti-collision system includes a means for defining an envelope around the boom section and a means for defining another envelope around the counterweight section of each boom, the envelopes forming boundaries of exclusion zones for the boom section and the counterweight section of the boom.

Preferably the anti-collision system includes a plurality of envelopes around each counterweight section, the envelopes including an inner envelope and successively outwardly spaces envelopes.

BRIEF DESCRIPTION OF THE DRAWINGS

The present invention is described further by way of example with reference to the accompanying drawings, of which.

DETAILED DESCRIPTION OF THE PREFERRED EMBODIMENTS

Figure 1:
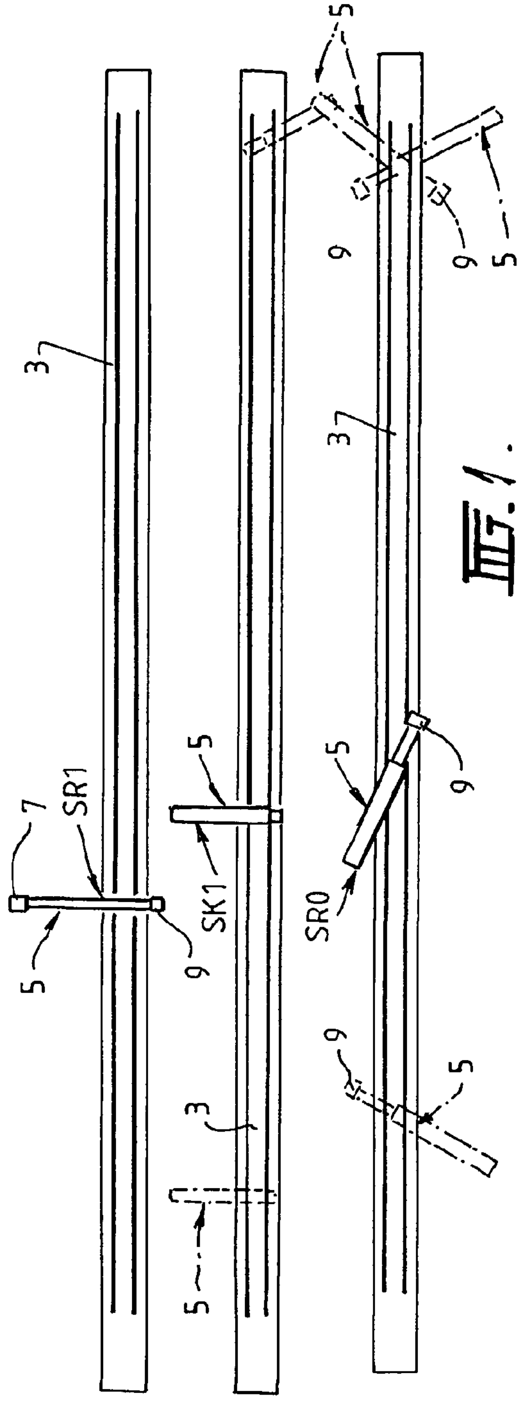
FIG. 1 is a top plan view of a typical coal stockpile yard.

FIG. 1 illustrates an example of a typical coal stockpile yard. The yard defines a x-y plane.

FIG. 1 illustrates that coal is delivered to and recovered from the yard by two stacker/reclaimers SR1 and SR0 and is delivered to the yard by a stacker SK1, each of which moves along a network of parallel tracks identified by the numeral 3.

Each of the machines SR1, SR0 and SK1 includes a body (not shown) that is constructed to engage the tracks 3 and to move the machines backwards and forwards along the tracks.

Each of the machines SR1, SR0, and SK1 also includes a boom 5 mounted to the body. Each boom 5 includes a coal delivery and/or recovery end 7 and a counterweight 9 at the other end of the boom.

More particularly, each boom 5 includes a boom section 21 and a counterweight section 23. Each boom 5 can be rotated about a vertical axis of the machine and can be raised/lowered relative to the horizontal.

It can be appreciated from FIG. 1 that the arrangement of the array of tracks 3 and the machines SR1, SR0 and SK1 enables coal to be delivered to and recovered from substantially the whole area of the yard.

Figures 2, 5:
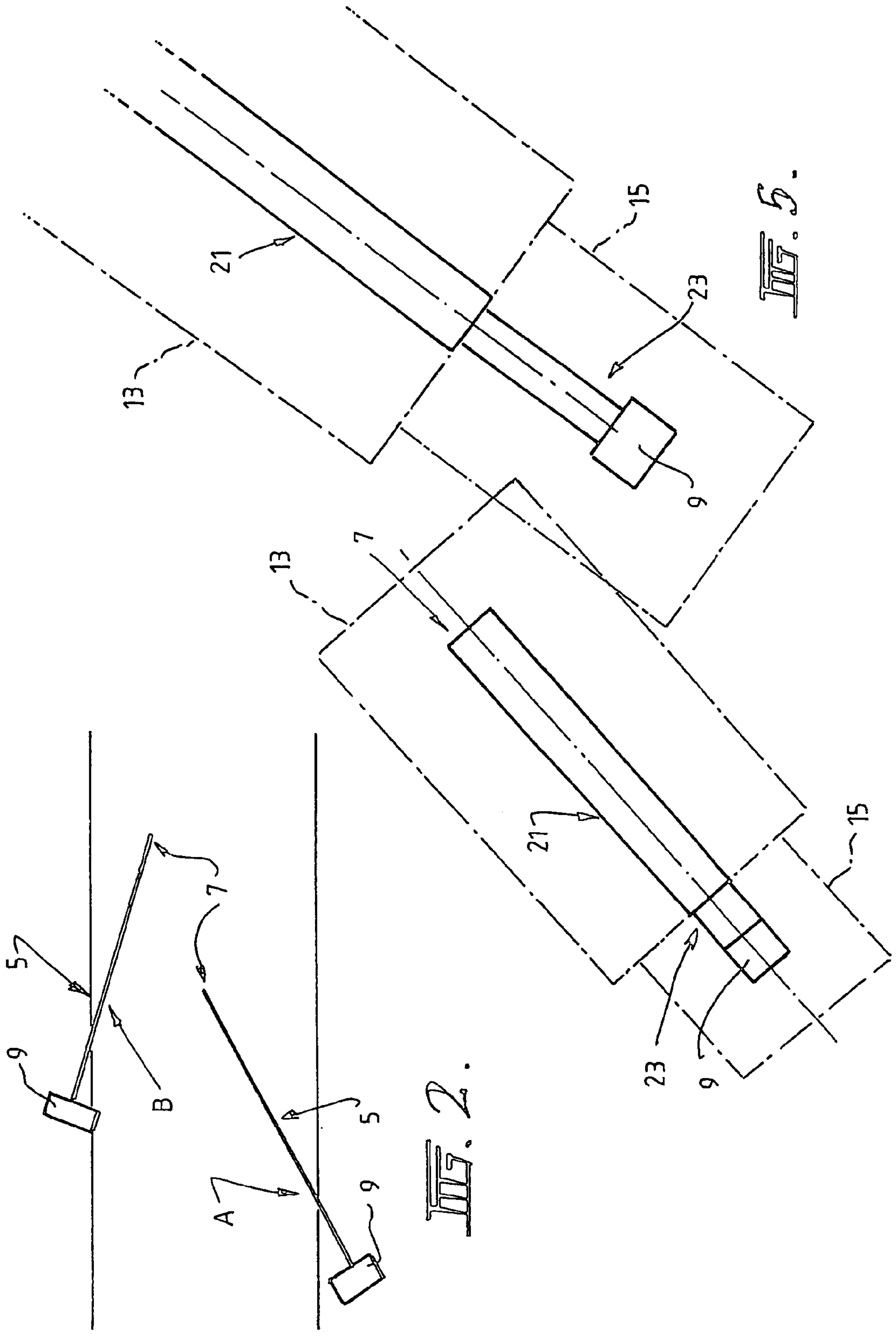
FIG. 2 is a top plan view that illustrates in diagrammatic form adjacent machines operating in the yard shown in FIG. 1.
FIG. 5 is a top plan view of two adjacent machines operating in the yard shown in FIG. 1, the figure illustrating a single exclusion zone around each of a boom section and a counterweight section of each boom of the machines when the machines are located with intersecting boundaries of the exclusion zones of (i) the boom section of one machine and the (ii) the counterweight section of the other machine.

FIG. 2 illustrates in diagrammatic form the relationship between adjacent machines, identified as Machines A and B.

It will be evident from consideration of FIGS. 1 and 2 that there are a number of possible situations in which the paths of movement of adjacent machines of the machines SR1, SR0 and SK1 can intersect with the result that there will be collisions of the machines.

Figure 3:
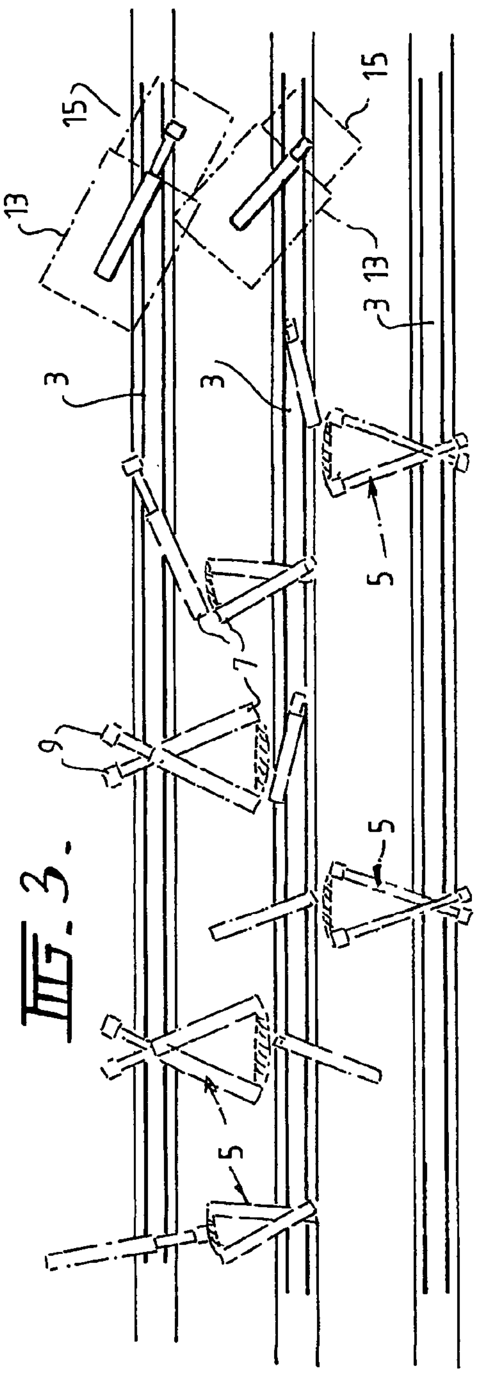
FIG. 3 is a top plan view of the yard shown in FIG. 1, the figure illustrating a series of possible collisions and clearance zones.

FIG. 3 illustrates several possible collision scenarios.

As stated above, the object of the present invention is to provide an anti-collision protection system that makes it possible to avoid such collisions and at the same time to maximise the useable space for yard operations.

The latter point is concerned with minimising, if not eliminating entirely, “dead” zones in the yard.

A preferred system of the present invention is designed to avoid collisions between: (i) the booms 5 of machines SR1 and SK1; (ii) the boom 5 of machine SR1 and the counterweight 9 of machine SK1; (iii) the counterweight 9 of machine SR1 and the boom 5 of machine SK1; (iv) the booms 5 of machines SR0 and SK1; (v) the boom 5 of machine SR0 and the counterweight of machine SK1; and (vi) the counterweight of machine SR0 and the boom 5 of machine SK1.

In terms of equipment, the preferred system includes (i) a PLC on each machine, (ii) point to point communications between each of the machine PLCs and a “hub” PLC, and (iii) a system PLC that carries most of the inter-machine anti-collision logic by running a compiled executable program within the PLC processor.

As stated above, the preferred system is based on creating at least one rectangular envelope around the boom section 21 of each boom 5 and at least one rectangular envelope around the counterweight section 23 of each boom 5, whereby the envelopes form boundaries of exclusion zones for the boom sections 21 and the counterweight sections 23 of the booms 5.

Figure 4:
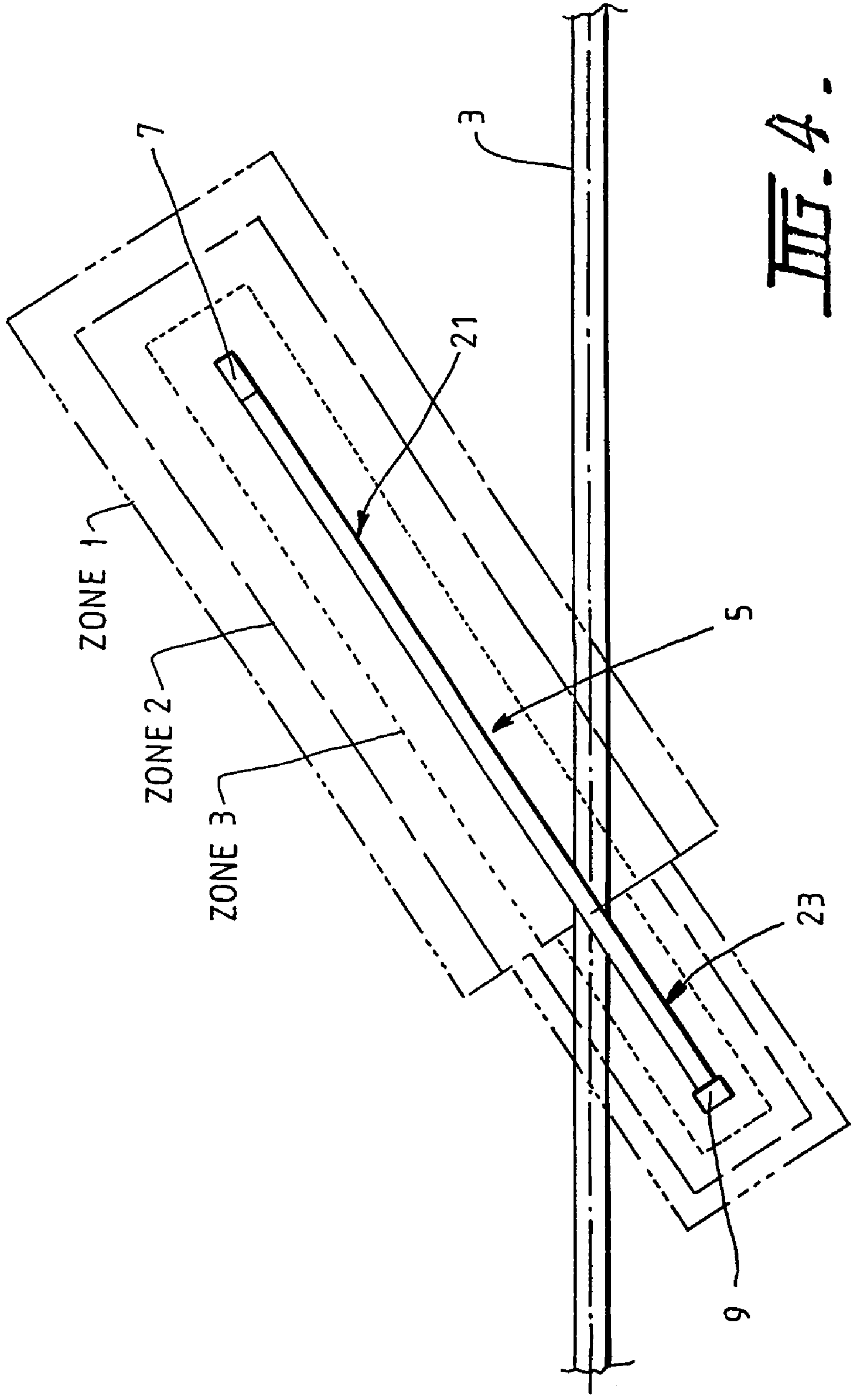
FIG. 4 is a top plan view of one of the machines operating in the yard shown in FIG. 1, the figure illustrating three exclusion zones around each of a boom section and a counterweight section of the boom of the machine.

FIG. 4 illustrates such envelopes, i.e. exclusion zones, for the machine shown in the figure in a situation where there are three envelopes for the boom section 21 of the boom 5 (which define Zones 1, 2 and 3) and three envelopes for the counterweight section 23 of the boom 5. Each envelope is rectangular in shape when the envelope is drawn on the x-y plane (ie the plane of the page) in relation to the longitudinal axis of the boom 5 as the axis appears projected onto the x-y plane.

Factors that are relevant to determine the sizes of the 3 envelopes for a machine include:

- Normal stopping distance for the machine—typically takes into account stopping delay associated with control system latency, travel stop distance, and slew stop distance.
- Abnormal stopping distance for the machine—typically takes into account stopping delay associated with control systems communications failure, extended travel stop distance on power failure, and extended slew stop distance on power failure.

Possible maximum inaccuracy in machine travel position.

FIG. 5 illustrates the envelopes, i.e. exclusion zones, for the two machines shown in the figure in a situation where there is a single envelope 13 for the boom section 21 of each boom 5 and a single envelope 15 for the counterweight section 23 of each boom 5.

As is also stated above, the preferred system is based on (i) detecting the intersection of the boundaries of the exclusion zones of adjacent machines and (ii) responding to detected intersections to avoid collisions.

The preferred system uses the following coordinate system.

An origin (0,0) is defined.

The x-axis is parallel to the machine travel tracks 3.

The forward (north) direction of travel is defined as positive.

The y-axis is perpendicular to the machine travel tracks 3.

The west direction is defined as positive on the y-axis.

All data transferred to the system has a base unit of measurement of 0.1 metres and 0.1 degrees.

In order to detect the intersection of the boundaries of the exclusion zones of adjacent machines, the preferred system locates the envelopes in space and then continuously determines whether the envelopes intersect.

The means for locating the envelopes in space includes sensors (not shown) on each machine for measuring the slew angles of the booms 5 and the long travel of the machines.

Each rectangular envelope is defined by its corners, as follows:

(X1,Y1), (X2,Y2), (X3,Y3), (X4,Y4)

Collision detection is accomplished by determining if any of the lines defining the envelopes of one of the machines intersect the lines defining the envelopes of an adjacent machine.

In order to determine whether a given envelope of one machine intersects another given envelope of another machine, the preferred system carries out the following steps.

1. Set (x0,y0) to one corner of one of the collision envelopes to be examined.
2. Set (x1,y1), (x2,y2), (x3,y3), (x4,y4) to the corners of the other collision envelope to be examined. These points are defined in the sequential order obtained by traversing the rectangular boundary in a clockwise direction with point (x1,y1) being to the left (i.e. anti-clockwise) of the boom tip or counterweight end.
3. If the angle from (x1,y1) to (x0,y0) is within the range from (thetas+180 degrees) to (thetas+270 degrees) and the angle from (x3,y3) to (x0,y0) is within the range of from thetas to (thetas+90 degrees) then the point (x0.y0) is enclosed within the boundary.
4. Steps 1. to 3. Are repeated for each point on both envelopes.

In the preferred system with three envelopes for the boom section 21 of the boom 5 (which define Zones 1, 2, and 3 as shown in FIG. 4) and three envelopes for the counterweight section 23 of the boom 5:

An intersection of the Zone 1 rectangles provides a "Warning Function".

An intersection of the Zone 2 rectangles results in the system disabling travel and slew in the direction of intrusion on both machines.

An intersection of the Zone 3 rectangles results in the system disabling travel, slew and luff in all directions on both machines.

In order to respond to a detected intersection, the preferred system determines the minimum distance between the adjacent machines and calculates angles between selected points on the machines.

The preferred system then uses the calculated angles to assess permissible slewing and travel movement of the machines to move the machines away from an intersecting situation and then moves the machines accordingly.

It will be apparent that the envelopes are sized so as to allow the system to avoid collisions and that the size of the envelopes may change dynamically in accordance with any changing requirements to avoid collision—eg changes to required braking distance.

Many modifications may be made to the present invention as described above by way of example without departing from the spirit and scope of the invention.

By way of example, the preferred system described above does not take into account the luff angles of the machines. However, it is noted that the present invention extends to systems that consider the luff angles of the machines.

By way of further example, the present invention is not limited to the particular: (i) means for defining envelopes around each boom that moves with the boom, (ii) means for detecting an intersection of the boundaries of the exclusion zones, and (iii) means responsive to a detected boundary intersection to prevent collision of the machines; described above.

What is claimed is:

1. An anti-collision protection system for machines that operate in a raw material stockpile yard, the machines being moveable in the yard in defined paths, each machine including a material delivery boom and/or material recovery boom that can be rotated about a vertical axis, which anti-collision protection system includes:

(a) a means for defining an envelope around each boom, each envelope being moveable with the corresponding boom and each envelope forming a boundary of an exclusion zone for the boom;

(b) a means for detecting an intersection of the boundaries of the exclusion zones along the predefined path for the boom that is adjacent and parallel at least one other predefined path for another boom; and (c) a means responsive to a detected boundary intersection to prevent collision of the machines.

2. The system defined in claim 1 wherein the envelope of each boom is defined in relation to a longitudinal axis of the boom.

3. The system defined in claim 1 wherein the envelope is rectangular in shape.

4. The system defined in claim 1 wherein the envelope is rectangular in shape when the envelope and the longitudinal axis of the boom are projected onto the x-y plane.

5. The system defined in claim 4 wherein the long sides of the envelope are equi-spaced from the longitudinal axis of the boom.

6. The system defined in claim 5 wherein the short sides of the envelope are equi-spaced from opposite ends of the boom.

7. The system defined in claim 1 wherein the envelope of each boom is responsive to the speed of slew and/or the speed of long travel of the machine and expands as the machine speed increases and contracts as the speed decreases.

8. The system defined in claim 1 wherein the envelope is defined by vector calculations that create the envelope as an envelope that moves with the boom.

9. The system defined in claim 1 wherein the means for detecting an intersection of the boundaries of the exclusion zones for the booms includes a means for defining the locations of the envelopes in space and a means for determining whether the envelopes intersect.

10. The system defined in claim 9 wherein the means for defining the locations of the envelopes in space includes, on each machine, a sensor for measuring the slew angle of the boom and a sensor for measuring the long travel of the machine along the defined path of the machine.

11. The system defined in claim 1 wherein the defined path of each machine is a rail track in the yard.

12. The system defined in claim 1, further comprising a plurality of envelopes around each boom, the envelopes including an innermost envelope and successively outwardly spaced envelopes.

13. The system defined in claim 12 wherein the means responsive to a detected boundary intersection responds differently for each of the plurality of envelopes.

14. The system defined in claim 12 wherein there are three envelopes around each boom and the means responsive to a detected boundary intersection:

(a) initiates a message on an operator console in a control room when there is penetration (i.e. an intersection) of an outermost envelope;

(b) movement of the penetrating machine is stopped when there is penetration of a middle envelope; and (c) movement of both machines is disabled when there is penetration of the innermost envelope.

15. The system defined in claim 14 wherein the means responsive to a detected boundary intersection initiates appropriate messages on the operator console when events (b) and (c) occur.

16. The system defined in claim 1 wherein the means responsive to a detected boundary intersection includes a means for moving the machines involved in the intersection away from each other.

17. The system defined in claim 16 wherein the means for moving the machines involved in the boundary intersection away from each other includes a means for determining the minimum distance between the booms of the machines.

18. The system defined in claim 1 wherein each boom includes a counterweight, whereby the boom includes a boom section and a counterweight section, and the system includes a means for defining an envelope around the boom section and a means for defining another envelope around the counterweight section of each boom, the envelopes forming boundaries of exclusion zones for the boom section and the counterweight section of the boom.

19. The system defined in claim 18 further comprising a plurality of envelopes around each counterweight section, the envelopes including an inner envelope and successively outwardly spaced envelopes.

20. An anti-collision protection system for machines that operate in a raw material stockpile yard, the machines being moveable in the yard in defined paths, each machine including a material delivery boom and/or material recovery boom that can be rotated about a vertical axis, which anti-collision protection system includes:

(a) a means for defining an envelope around each boom, each envelope being moveable with the corresponding boom and each envelope forming a boundary of an exclusion zone for the boom, and the envelope of each boom being responsive to the speed of slew and/or the speed of long travel of the machine to expand as the machine speed increases and contract as the speed decreases;

(b) a means for detecting an intersection of the boundaries of the exclusion zones along the predefined path for the boom that is adjacent and parallel at least one other predefined path for another boom; and (c) a means responsive to a detected boundary intersection to prevent collision of the machines.

21. An anti-collision protection system for machines that operate in a raw material stockpile yard, the machines being moveable in the yard in defined paths, each machine including a material delivery boom and/or material recovery boom that can be rotated about a vertical axis, which anti-collision protection system includes:

(a) a means for defining an envelope around each boom, each envelope being moveable with the corresponding boom and each envelope forming a boundary of an exclusion zone for the boom;

(b) a means for detecting an intersection of the boundaries of the exclusion zones along the predefined path for the boom that is adjacent and parallel at least one other predefined path for another boom, the means for detecting including a means for defining the locations of the envelopes in space and a means for determining whether the envelopes intersect; and (c) a means responsive to a detected boundary intersection to prevent collision of the machines.

22. An anti-collision protection system for machines that operate in a raw material stockpile yard, the machines being moveable in the yard in defined paths, each machine including a material delivery boom and/or material recovery boom that can be rotated about a vertical axis, which anti-collision protection system includes:

(a) a means for defining an envelope around each boom, each envelope being moveable with the corresponding boom and each envelope forming a boundary of an exclusion zone for the boom;

(b) a means for detecting an intersection of the boundaries of the exclusion zones along the predefined path for the boom that is adjacent and parallel at least one other predefined path for another boom;

(c) a means responsive to a detected boundary intersection to prevent collision of the machines; and (d) a plurality of envelopes around each boom, the envelopes including an innermost envelope and successively outwardly spaced envelopes.

23. An anti-collision protection system for machines that operate in a raw material stockpile yard, the machines being moveable in the yard in defined paths, each machine including a material delivery boom and/or material recovery boom that can be rotated about a vertical axis, which anti-collision protection system includes:

(a) a means for defining an envelope around each boom, each envelope being moveable with the corresponding boom and each envelope forming a boundary of an exclusion zone for the boom;

(b) a means for detecting an intersection of the boundaries of the exclusion zones along the predefined path for the boom that is adjacent and parallel at least one other predefined path for another boom; and (c) a means responsive to a detected boundary intersection to prevent collision of the machines, the means responsive to a detected boundary intersection including a means for moving the machines involved in the intersection away from each other.

24. An anti-collision protection system for machines that operate in a raw material stockpile yard, the machines being moveable in the yard in defined paths, each machine including a material delivery boom and/or material recovery boom that can be rotated about a vertical axis, which anti-collision protection system includes:

(a) a means for defining a first envelope around each boom, each first envelope being moveable with the corresponding boom and forming a first boundary of an exclusion zone for the boom, each boom including a counterweight, a boom section and a counterweight section;

(b) a means for detecting an intersection of the boundaries of the exclusion zones along the predefined path for the boom that is adjacent and parallel at least one other predefined path for another boom;

(c) a means responsive to a detected boundary intersection to prevent collision of the machines;

(d) a means for defining a second envelope around the boom section; and (e) a means for defining another envelope around the counterweight section of each boom, the second and another envelopes forming second boundaries of exclusion zones for the boom section and the counterweight section of the boom.

* * * * *